United States Patent
Hartmann-Thompson et al.

(10) Patent No.: US 12,281,217 B2
(45) Date of Patent: Apr. 22, 2025

(54) MICROSTRUCTURED FILM COMPRISING POLYALKYLENE OXIDE BLOCK COPOLYMER, COMPOSITIONS AND METHODS

(71) Applicant: 3M INNOVATIVE PROPERTIES COMPANY, St. Paul, MN (US)

(72) Inventors: Claire Hartmann-Thompson, Lake Elmo, MN (US); Kurt J. Halverson, Lake Elmo, MN (US); Raymond P. Johnston, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 460 days.

(21) Appl. No.: 17/762,455

(22) PCT Filed: Nov. 19, 2020

(86) PCT No.: PCT/IB2020/060938
§ 371 (c)(1),
(2) Date: Mar. 22, 2022

(87) PCT Pub. No.: WO2021/099998
PCT Pub. Date: May 27, 2021

(65) Prior Publication Data
US 2022/0363877 A1    Nov. 17, 2022

Related U.S. Application Data

(60) Provisional application No. 62/938,519, filed on Nov. 21, 2019.

(51) Int. Cl.
| | | |
|---|---|---|
| *C08L 23/06* | (2006.01) | |
| *B29C 33/42* | (2006.01) | |
| *C08L 23/0807* | (2025.01) | |
| *C08L 23/0853* | (2025.01) | |
| *C08L 71/02* | (2006.01) | |

(52) U.S. Cl.
CPC .............. *C08L 23/06* (2013.01); *B29C 33/42* (2013.01); *C08L 23/0853* (2013.01); *C08L 2203/18* (2013.01)

(58) Field of Classification Search
CPC .......... C08L 71/00; C08L 71/02; C08L 71/08; C08L 23/06; C08L 23/0853; C08L 23/12
See application file for complete search history.

(56) References Cited

U.S. PATENT DOCUMENTS

| | | |
|---|---|---|
| 5,514,120 A | 5/1996 | Johnston |
| 5,728,446 A | 3/1998 | Johnston |
| 6,110,849 A | 8/2000 | Tsai et al. |
| 6,372,323 B1 | 4/2002 | Kobe |
| 6,372,954 B1 | 4/2002 | Johnston |
| 6,375,871 B1 | 4/2002 | Bentsen |
| 6,381,846 B2 | 5/2002 | Insley |
| 6,420,622 B1 | 7/2002 | Johnston |
| 6,531,206 B2 | 3/2003 | Johnston |
| 6,746,567 B2 | 6/2004 | Johnston |
| 6,777,082 B2 | 8/2004 | Patel |
| 6,803,090 B2 | 10/2004 | Castiglione |
| 6,907,921 B2 | 6/2005 | Insley |
| 10,569,230 B2 | 2/2020 | Huizing et al. |
| 2005/0106360 A1 | 5/2005 | Johnston |
| 2009/0242048 A1 | 10/2009 | Sherman |
| 2010/0107345 A1 | 5/2010 | Sierakowski |
| 2013/0108801 A1 | 5/2013 | Naessens |
| 2017/0037177 A1* | 2/2017 | Berzinis .................. C08L 71/12 |
| 2020/0030750 A1 | 1/2020 | Chapel et al. |
| 2020/0131375 A1* | 4/2020 | Chen ........................ C08L 83/12 |

FOREIGN PATENT DOCUMENTS

| | | |
|---|---|---|
| CN | 101036861 A | 9/2007 |
| CN | 107735165 A | 2/2018 |
| CN | 108290731 A | 7/2018 |
| CN | 109499392 A | 3/2019 |
| CN | 110300630 A | 10/2019 |
| EP | 1 180 533 A1 | 2/2002 |
| EP | 2404867 | 1/2012 |
| EP | 3370868 | 9/2018 |
| JP | 2005255702 | 9/2005 |
| JP | 2010-111095 | * 5/2010 |
| WO | WO 1999-007790 | 2/1999 |
| WO | WO 2004-041721 | 5/2004 |
| WO | WO 2007-140225 | 12/2007 |
| WO | WO 2015-164632 | 10/2015 |

(Continued)

OTHER PUBLICATIONS

Machine translation of CN 101015773 (no date).*
Machine translation of CN 105860120 (no date).*
Bailey, "Poly(Ethylene Oxide)", (1976), Table of Content, 4 Pages.
Bhattarai, "Design and Characterisation of a Polyethylene Oxide Matrix with the Potential Use as a Teat Insert for Prevention/Treatment of Bovine Mastitis", The AAPS Journal, Oct. 2014, vol. 17, No. 1, pp. 167-174.
Cassie, "Contact Angles" Discussions of the Faraday Society, 1948, vol. 3, pp. 11-16.
Crowley, Stability of polyethylene oxide in matrix tablets prepared by hot-melt extrusion, Biomaterials, 2002, vol. 23, No. 21, pp. 4241-4248.
Harris, "Poly(Ethylene Glycol) Chemistry and Biological Applications", American Chemical Society, (1997), pp. 45-57.

(Continued)

*Primary Examiner* — Marc S Zimmer
(74) *Attorney, Agent, or Firm* — Carolyn A. Fischer

(57) ABSTRACT

An article (e.g. film, tape or pipe) is described comprising a microstructured surface. The microstructured surface comprises a thermoplastic polymer; and a block copolymer additive comprising a poly(alkylene)oxide block having a molecular weight greater than 250 or 500 g/mole and at least one hydrophobic block. Also described is a method of making such articles. Also described is a triblock copolymer comprising a poly(alkylene oxide) midblock and hydrocarbon end blocks; and compositions comprising a thermoplastic polymer and un to 50 wt. % of the block copolymer.

20 Claims, 2 Drawing Sheets

(56) References Cited

FOREIGN PATENT DOCUMENTS

| WO | 2017/014936 A1 | 1/2017 |
| WO | WO 2019-133459 | 7/2019 |

OTHER PUBLICATIONS

Khademhosseini, "Molded polyethylene glycol microstructures for capturing cells within microfluidic channels", Lab on a Chip, 2004, vol. 4, No. 5, pp. 425-430.

Lenz, "Wetting Phenomena on Structured Surface", Advance Materials, 1999, vol. 11 No. 8, pp. 1531-1534.

Li, "Polyethylene-b-poly(ethylene glycol) diblock copolymers: New synthetic strategy and application", Journal of Applied Polymer Science, Jul. 2015, vol. 132, No. 28(42236), 10 pages.

Lupo, "Condensation Mitigation", Quality Assurance and Food Safety Magazine, [on line], Dec. 2016, [retrieved from the internet on May 31, 2022] URL <http://www.qualityassurancemag.com/article/cleaning-sanitation-condensation-mitigation/>, 6 pages.

Shi, "Enhanced performance of modified HDPE separators generated from surface enrichment of polyether chains for lithium ion secondary battery" Journal of Membrane Science, Feb. 2013, vol. 429, pp. 355-363.

Technical Information: "Dow LDPE 9551 Low Density Polyethylene", MAtWEb LLC., 1996, 2 pages.

Technical Information: "Jeffamine ED-2003 Polyetheramine", Huntsman Corporation, 2007, 2 pages.

Tirelli, "Poly(ethylene glycol) block copolymers", Reviews in Molecular Biotechnology, Mar. 2002, vol. 90, No. 1, pp. 3-15.

Ucar, "Combined XPS and contact angle studies of ethylene vinyl acetate and polyvinyl acetate blends" Applied Surface Science, 2011, vol. 257, No. 22, pp. 9587-9594.

Wagner, "Biocompatible fluorinated polyglycerols for droplet microfluidics as an alternative to PEG-based copolymer surfactants", Biocompatible, Lab on a Chip, 2016, vol. 16, No. 1, pp. 65-69.

Yoon. "Reusable, polyethylene glycol-structured microfluidic channel for particle immunoassays J-H Han", Journal of Biological Engineering, Apr. 2009, vol. 3, No. 1, 6 pages.

Zhu, "Tuning Wettabtlity and Getting Superhydrophobic Surface by Controlling Surface Roughness With Well-Designed Microstructrures", The 13th International Conference on Solid-State Sensors, Actuators and Microsystems, Seoul, Korea, Jun. 2005, pp. 1481-1484.

International Search Report for PCT International Application No. PCT/IB2020/060938, mailed on Feb. 24, 2021, 4 pages.

\* cited by examiner

MICROSTRUCTURED FILM COMPRISING POLYALKYLENE OXIDE BLOCK COPOLYMER, COMPOSITIONS AND METHODS

SUMMARY

In one embodiment an article is described, preferably comprising a microstructured surface. The microstructured surface comprises a thermoplastic polymer; and a block copolymer additive comprising a poly(alkylene)oxide block having a molecular weight greater than 250 g/mole and at least one hydrophobic block.

In another embodiment, a method of making an article is described comprising: providing a composition comprising a thermoplastic polymer, and a block copolymer additive comprising a poly(alkylene)oxide block having a molecular weight greater than 250 g/mole and a least one hydrophobic block, and thermal processing the composition into an article.

In some embodiments, the article is a film, tape, or pipe. In some embodiments, the article has a microstructured surface.

In another embodiment, a favored block copolymer is described having the general structure:

A[LB]n wherein
A comprises poly(alkylene oxide),
L is a covalent bond or a divalent linking group,
B comprises a hydrocarbon group;
n is at least 2.

In another embodiment, a composition is described comprising a thermoplastic polymer and up to 50 wt,% of a block copolymer as described herein.

DETAILED DESCRIPTION

In some embodiments, articles are described comprising a microstructured surface. With reference to FIGS. 1-3, a microstructured surface can be characterized in three-dimensional space by superimposing a Cartesian coordinate system onto its structure. A first reference plane, referred to as the y-z plane, has the x-axis as its normal vector. A second reference plane, referred to as the x-y plane, has the z-axis as its normal vector. A third reference plane, referred to as the x-z plane, has the y-axis as its normal vector.

In some embodiments, the articles are three-dimensional on a macroscale. However, on a microscale (e.g. surface area that includes at least two adjacent microstructures with a valley or channel disposed between the microstructures) the base layer or surface 110a can be considered planar with respect to the microstructures. The width and length of the microstructures are in the x-y plane and the height of the microstructures is in the z-direction. Further, the base layer is parallel to the x-y plane and orthogonal to the z-axis. In some embodiments, the microstructure has at least two dimensions, e.g. width in the x direction and height in the z direction having dimensions less than 1 mm. In other embodiments, the microstructure has one dimensions, e.g. height in the z direction having a dimension less than 1 mm.

The microstructured article comprises a hydrophilic surface. In one embodiment, the microstructured surface may be characterized as a fluid transport surface.

One class of fluid transport surfaces discussed below are configured to wick hanging droplets (e.g. from condensation on a pipe, as in WO2015/164632) into hydrophilic microreplicated channels and to disperse the liquid by capillary action across the fluid transport surface, thus significantly increasing the surface to volume ratio of the liquid and promoting evaporation. Fluid transport features on a horizontally oriented structure having a convex outer surface, such as a pipe, provide a capillary wicking direction that has a component orthogonal to the direction of the gravitational force. In some embodiments, the fluid transport features may direct the condensate fluid to designated locations. These locations may be chosen based on drainage points or designated drip points.

The figures are not necessarily to scale. Like numbers used in the figures refer to like components. However, it will be understood that the use of a number to refer to a component in a given figure is not intended to limit the component in another figure labeled with the same number.

Figure 1A:
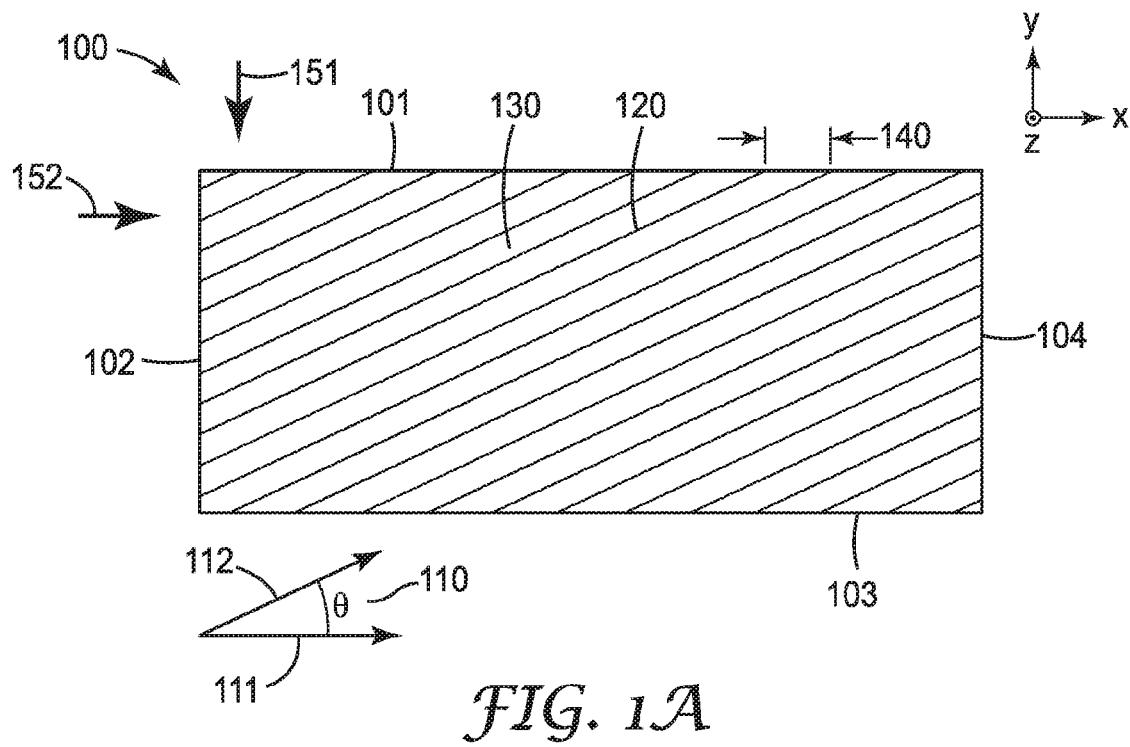
FIG. 1A illustrates a fluid control layer with angled channels in accordance with embodiments disclosed.

FIG. 1A illustrates an elongated fluid control layer with flow channels (microchannels) that are disposed at an angle, θ, with respect to a longitudinal axis of the fluid control layer, the x-axis in FIG. 1A. Fluid control layer 100 includes an array of channels 130 that extend across the fluid control layer 100 along a channel longitudinal axis 112. Ridges 120 rise above the surface of the fluid control layer 100 along the z axis to form the channels 130, with each channel 130 having a ridge 120 on either side running along the channel longitudinal axis 112. In some embodiments, each set of adjacent ridges 120 are equally spaced apart. In other embodiments, the spacing of the adjacent ridges 120 may be at least two different distances apart. A longitudinal axis 111 of the fluid control layer 100 intersects with the channel longitudinal axis 112 to make a channel angle 110. The angle 110 may be between 0 and 90 degrees. In some embodiments, the channel angle 110 is less than about 45 degrees. In some embodiments, the channel angle 110 is between about 5 degrees and about 30 degrees, or about 5 degrees to about 20 degrees or about 10 degrees to about 15 degrees. In some embodiments, the channel angle 110 is about 20 degrees.

The channels 130 are configured to provide capillary movement of fluid in the channels 130 and across the fluid control layer 100. The capillary action wicks the fluid to disperse it across the fluid control layer 100 so as to increase the surface to volume ratio of the fluid and enable more rapid evaporation. The dimensions of the channel openings 140 can be configured to wick fluid that collects at an edge 101, 102, 103, 104 of the fluid control layer 100 into the channels 130 by capillary action. The channel cross section 130, 230, 231, 330, channel surface energy, and fluid surface tension determines the capillary force. The land thickness t provides a ledge that can impede liquid acquisition. Preferably the land thickness is kept to a minimum to encourage rapid liquid acquisition. Small channel angles 110 provide larger the openings 140 at the top and bottom edges 101, 103 which run along the longitudinal axis of the fluid control layer 100 as shown in FIG. 1A. Larger openings 140 of the channels 130 results in fewer openings 140 per unit of length along the top and bottom edges 101, 103 of the fluid control layer 100.

Each channel 130 in the fluid control layer 100 has a first opening at a first edge of the fluid control layer 100 and a second opening at a second edge of the fluid control layer 100. For example, the first opening may be located on a first edge 101 and the second opening may be located on a second edge 102 that is adjacent and intersects the first edge 101. In this example, the first and second opening may be the same size or different sizes depending on the channel angle 110. Fluid can enter the fluid control layer 100 at the first edge along a first direction 151 and can enter the fluid control layer 100 at a second edge along a second direction 152. As another example, the first opening may be located on a first edge 102 and the second opening may be located on an opposing edge 103. In some embodiments, the channel openings 140 are present on all four edges 101-104 of the fluid control layer 100. This arrangement provides a plurality of openings 140 for droplets to enter the channels 130 and then disperse within the channels 130 of the fluid control layer 100.

Figure 1B:
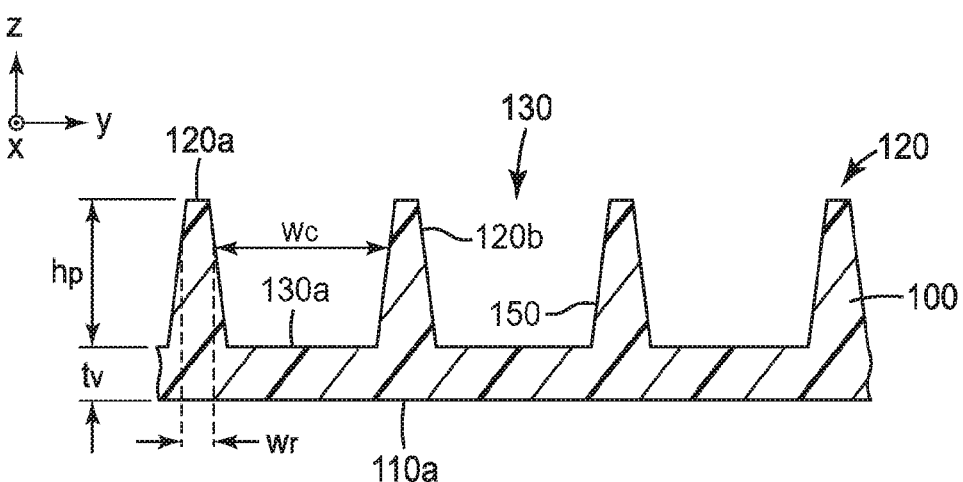
FIG. 1B illustrates a cross section of the fluid control layer of an example embodiment.

FIG. 1B illustrates a cross section of fluid control layer 100. The channels 130 of the fluid control layer 100 are defined by first and second ridges 120 disposed on either side of the channel 130. As shown in FIG. 1B, in some embodiments the ridges 120 can extend along the z-axis, generally normal to the bottom surface 130a of the channel 130. Alternatively, in some embodiments, the ridges can extend at a non-perpendicular angle with respect to the bottom surface of the channel. The first and second primary ridges 120 have a height $h_p$ that is measured from the bottom surface 130a of the channel 130 to the top surface 120a of the ridges 120. The ridge height $h_p$ may be selected to provide durability and protection to the fluid control layer 100. In some embodiments, the ridge height $h_p$ is about 25 μm to about 3000 μm, the cross-sectional channel width, $w_c$, is about 25 μm to about 3000 μm, and the cross sectional ridge width, $w_r$, is about 30 μm to about 250 μm.

In some embodiments, as shown in FIG. 1B, the side surfaces 120b of the channels 130 may be sloped in cross section so that the width of the ridge at the bottom surface 130a of the channel is greater than the width of the ridge at the top surface 120a of the ridges 120. In this scenario, the width of the channel 130 at the bottom surface 130a of the channel is less than the width of the channel 130 at the top surface 120a of the ridges 120. Alternatively, the side surfaces of the channels could be sloped so that the channel width at the bottom surface of the channel is greater than the channel width at the top surface of the ridges. When the width of the channel is not the same throughout the height of the channel, the cross-sectional width, $w_r$, can be expressed as an average width.

The fluid control layer 100 has a thickness $t_v$, measured from the bottom surface 110a of the fluid control layer 100 to the bottom surface of the channel 130a. The thickness $t_v$ can be selected to allow liquid droplets to be wicked into the fluid control layer 100 but still maintain a robust structure. In some embodiments, the fluid control layer thickness $t_v$ is less than about 75 μm thick, or between about 20 μm to about 200 μm.

In some embodiments, as shown in FIG. 1B, the bottom surface of the channels comprise flat surfaces (i.e. surfaces that are parallel to planar bottom surface 110a). The flat surfaces can be 2×, 3×, 4×, 5× or greater than the cross-sectional width of the channels.

Figure 2A:
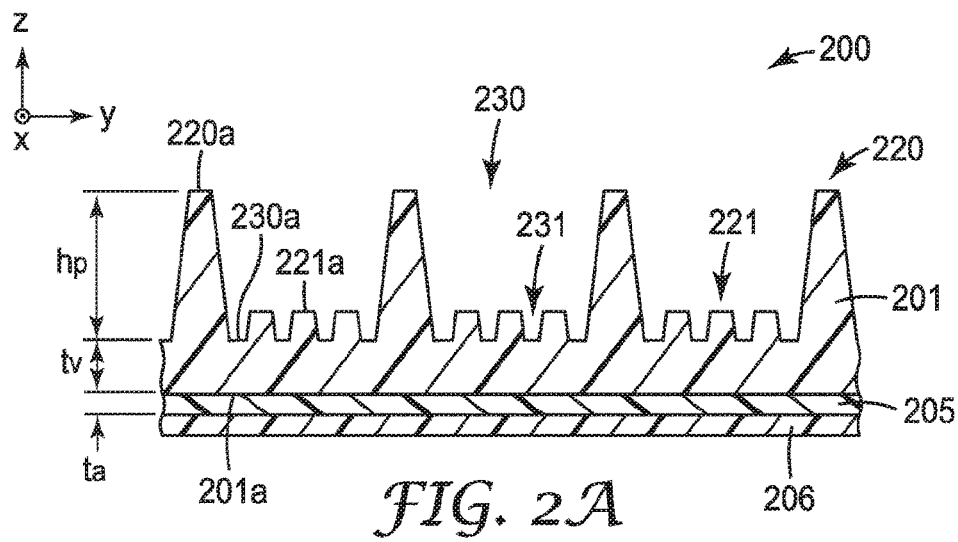
FIGS. 2A and 2B illustrate a cross section of a fluid control layer with primary and secondary channels according to an example embodiment.
Figure 2B:
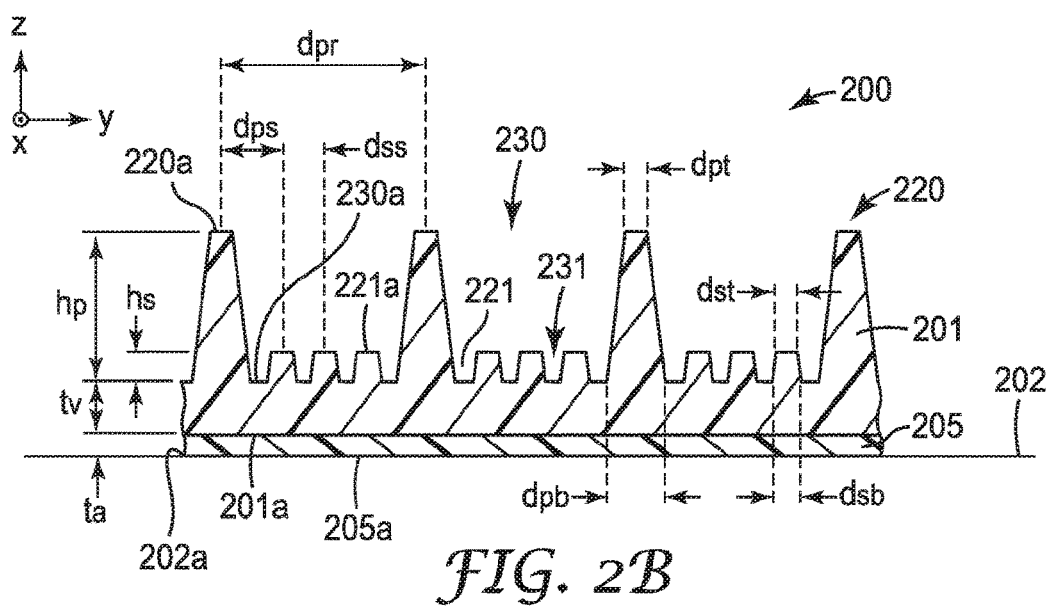
Figure 3:
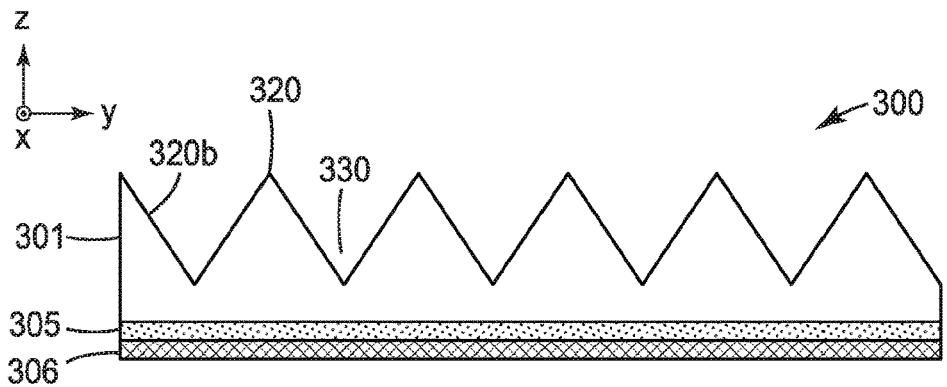
FIG. 3 illustrates a cross section of a fluid control layer with ridges and channels according to an example embodiment.

FIGS. 2A and 2B are cross sections of a fluid control device 200 according to an example embodiment. The fluid control device 200 shown in FIG. 2A includes a fluid control film, an optional adhesive layer 205 and an optional release layer 206 disposed on the surface of the adhesive layer opposite the fluid control layer 201. The release layer 206 may be included to protect the adhesive layer 205 prior to the application of the adhesive layer 205 to the external surface 202. FIG. 2B shows the fluid control device 200 installed on an external surface 202 with the release layer removed.

The fluid control device 200 comprises a fluid control layer 201 having primary and secondary channels 230, 231 defined by primary and secondary ridges 220, 221, wherein the channels 230, 231 and ridges 220, 221 run along a channel axis that makes an angle, θ, with respect to the longitudinal axis of the fluid control layer 201, e.g., the x-axis as previously discussed in connection with FIG. 1A. Each primary channel 230 is defined by a set of primary ridges 220 (first and second) on either side of the primary channel 230. The primary ridges 220 have a height $h_p$ that is measured from the bottom surface 230a of the channel 230 to the top surface 220a of the ridges 220.

In some embodiments, microstructures are disposed within the primary channels 230. In some embodiments, the microstructures comprise secondary channels 231 disposed between the first and secondary primary ridges 220 of the primary channels 230. Each of the secondary channels 231 is associated with at least one secondary ridge 221. The secondary channels 231 may be located between a set of secondary ridges 221 or between a secondary ridge 221 and a primary ridge 220.

The center-to-center distance between the primary ridges, $d_{pr}$, may be in a range of about 25 μm to about 3000 μm; the center-to-center distance between a primary ridge and the closest secondary ridge, $d_{ps}$, may be in a range of about 5 μm to about 350 μm; the center-to-center distance between two secondary ridges, $d_{ss}$, may be in a range of about 5 μm to about 350 μm. In some cases, the primary and/or secondary ridges may taper with distance from the base. The distance between external surfaces of a primary ridge at the base, $d_{pb}$, may be in a range of about 15 μm to about 250 μm and may taper to a smaller distance of $d_{pt}$ in a range of about 1 μm to about 25 μm. The distance between external surfaces of a secondary ridge at the base, $d_{sb}$, may be in a range of about 15 μm to about 250 μm and may taper to a smaller distance of da in a range of about 1 μm to about 25 μm. In one example, $d_{pp}$=0.00898 inches, $d_{ps}$=0.00264 inches, $d_{ss}$=0.00185 inches, $d_{pb}$=0.00251 inches, $d_{pt}$=0.00100 inches, $d_{sb}$=0.00131 inches, $d_{st}$=0.00100 inches, $h_p$=0.00784 inches, and $h_s$=0.00160 inches.

The secondary ridges have height $h_s$ that is measured from the bottom surface 230a of the channel 230 to the top surface 221a of the secondary ridges 221. The height $h_p$ of the primary ridges 220 may be greater than the height $h_s$ of the secondary ridges 221. In some embodiments the height of the primary ridges is between about 25 μm to about 3000 μm and the height of the secondary ridges is between about 5 μm to about 350 μm. In some embodiments, a ratio of the secondary ridge 221 height $h_s$ to the primary ridge 220 height $h_p$ is about 1:5. The primary ridges 220 can be designed to provide durability to the fluid control layer 200 as well as protection to the secondary channels 231, secondary ridges and/or or other microstructures disposed between the primary ridges 220.

The fluid control device 200 may also have an adhesive layer 205 disposed on the bottom surface 201a of the fluid control layer 201. The adhesive layer 205 may allow the fluid control layer 200 to be attached to some external surface 202 to help manage liquid dispersion across the external surface. The combination of an adhesive layer 205 and the fluid control layer 201 forms a fluid control tape. The adhesive layer 205 may be continuous or discontinuous. The tape 200 may be made with a variety of additives that, for example, make the tape flame retardant and suitable for wicking various liquids including neutral, acidic, basic and/or oily materials.

The fluid control layer 201 is configured to disperse fluid across the surface of the fluid control layer 201 to facilitate evaporation of the fluid. In some embodiments, the adhesive layer 205 may be or comprise a hydrophobic material that repels liquid at the interface 202a between the adhesive layer 205 and the external surface 202, reducing the collection of liquid at the interface 202a.

The adhesive layer 205 has a thickness $t_a$ and the fluid control layer 201 has a thickness $t_v$ from the bottom surface 230a of the channels 230, 231 to the bottom surface 201a of the fluid control layer 201. In some embodiments, the total thickness between the bottom surface 230a of the channels 230, 231 and the bottom surface 205a of the adhesive layer 205, $t_v+t_a$ can be less than about 300 μm, e.g., about 225 μm. This total thickness $t_v+t_a$ may be selected to be small enough to allow liquid to be efficiently wicked from the external surface 202 through the channel openings at the edges of the fluid control layer 201 and into the channels 230, 231.

FIG. 3 illustrates a cross section of a fluid control device 300 with ridges and channels according to an example embodiment. The fluid control layer 301 includes channels 330 that are v-shaped with ridges 320 that define the channels 330. In this embodiment, the side surfaces 320b of the channels are disposed at an angle with respect to the axis normal to the layer surface, i.e., the z axis in FIG. 3. As previously discussed, the channels 330 and ridges 320 of the fluid control layer 301 run along a channel axis that makes an angle, θ, with respect to the longitudinal axis of the fluid control layer 301, e.g., the x-axis as previously discussed in connection with FIG. 1A. The ridges 320 may be equal distance apart from one another. The fluid control layer 301 may have an adhesive layer 305 disposed on the bottom surface of fluid control layer 301. As previously discuss in connection with FIG. 2A, fluid control device 300 may also include a release layer 306 disposed on the adhesive layer 305.

In some embodiments, the microstructured surface is disposed in a layer that is permanently or temporarily disposed to the convex outer surface of a structure, such as a pipe. For example, a tape having a fluid control layer that includes channels, as shown in FIG. 2B, may be adhered by an adhesive layer to the convex outer surface of the structure. In other embodiments, the microstructured surface (e.g. fluid control channels) may be formed directly on the outer surface of a pipe during manufacture of the pipe or may be formed on a coating layer deposited on the pipe outer surface.

Articles with fluid control microstructured surfaces are described in greater detail in WO 2015/164632; incorporated herein by reference.

In some embodiments, the (e.g. microstructures) films described herein can be prepared using an extrusion embossing process that allows continuous and/or roll-to-roll film fabrication. According to one suitable process, a flowable material is continuously brought into line contact with a molding surface of a molding tool. The molding tool includes an embossing pattern cut into the surface of the tool, the embossing pattern being the microchannel pattern of the fluid control film in negative relief. A plurality of microchannels is formed in the flowable material by the molding tool. The flowable material is solidified to form an elongated fluid control film that has a length along a longitudinal axis and a width, the length being greater than the width. The microchannels can be formed along a channel longitudinal axis that makes an angle that is greater than 0 and less than 90 degrees with respect to the longitudinal axis of the film. In some embodiments, the angle is less than 45 degrees, for example.

The flowable material may be extruded from a die directly onto the surface of the molding tool such that flowable material is brought into line contact with the surface of molding tool. The flowable material may comprise, for example, various photocurable, thermally curable, and thermoplastic resin compositions. The line contact is defined by the upstream edge of the resin and moves relative to both molding tool and the flowable material as molding tool rotates. The resulting fluid control film may be a single layer article that can be taken up on a roll to yield the article in the form of a roll good. In some implementations, the molding tool may be a roll or belt and forms a nip along with an opposing roller. The nip between the molding tool and opposing roller assists in forcing the flowable material into the molding pattern. The spacing of the gap forming the nip can be adjusted to assist in the formation of a predetermined thickness of the fluid control film. Additional information about suitable fabrication processes for the disclosed fluid control films are described in commonly owned U.S. Pat. Nos. 6,375,871 and 6,372,323, both incorporated herein by reference.

The (e.g. microstructured) films discussed herein can be formed from various thermoplastic polymers suitable for casting or embossing including, for example, polyolefins, polyesters, polyamides, poly(vinyl chloride), polyether esters, polyimides, polyesteramide, polyacrylates, polyvinylacetate, hydrolyzed derivatives of polyvinylacetate, etc. In some embodiments, the thermoplastic polymer is a polyolefin polymer comprising at least 50, 55, 60, 65, 70, 75, 80, 85, 90, or 95 wt. % of polymerized olefins. Specific embodiments include polyolefins, such as polyethylene or polypropylene, blends and/or copolymers thereof, and copolymers of propylene and/or ethylene with minor proportions (e.g. less than 50, 45, 40, 35, 30 or 25 wt. %) of other monomers, such as vinyl acetate or acrylates such as methyl(meth)acrylate and butylacrylate. Polyolefins readily replicate the surface of a casting or embossing roll. They are tough, durable and hold their shape well, thus making such films easy to handle after the casting or embossing process.

In some embodiments, the thermoplastic polymer may be described as a hydrophobic (e.g. olefin) polymer (i.e. homopolymer or copolymer) having a static contact angle greater than 90 degrees. In some embodiments, the thermoplastic polymer has a static contact angle with water of at least 91, 92, 93, 94, 95, 96, 97, 98, 99, 100 degrees or greater. For example, polybutadiene and polyethylene are both reported to have a static contact angles with water of 96 degrees; polypropylene is reported to have a static contact angles with water of 102 degrees; and polyisobutylene is reported to have a static contact angles with water of 102 degrees. Mixtures of polyolefin materials can be utilized.

In other embodiments, the thermoplastic polymer may be described as a hydrophilic (e.g. olefin) polymer (e.g. homopolymer or copolymer) having a static contact angles with water of less than 90 degrees. In some embodiments, the hydrophilic (e.g. olefin) polymer has a static contact angle with water of less than 85, 80, or 75 degrees. For example, ethylene-vinyl acetate has a static contact angle with water of 76 degrees. In some embodiments, the thermoplastic hydrophilic (e.g. olefin) polymer has a static contact angle with water of at least 60, 65, 70, 75, 80, or 85 degrees. However, the hydrophilic (e.g. olefin) polymer alone has a higher static contact angle with water than when combined with the block copolymer additive described herein.

The static contact angle of the thermoplastic polymer can be measured according to the test method described in the examples.

Although plasma treatment as described in WO2015/164632 can provide a durable hydrophilic surface, over time these surfaces can degrade and become less hydrophilic and add manufacturing complexity by adding additional process steps.

Presently described are compositions that are amenable to thermal processing, such as melt extrusion. The composition comprises a thermoplastic polymer and a hydrophilic block copolymer additive. The hydrophilic block copolymer additive is more hydrophilic than the thermoplastic polymer. The block copolymer additives comprises at least one polyalkylene oxide block and one or more hydrophobic blocks, i.e. blocks comprised of a hydrophobic material. Hydrophobic materials form a static contact angle with water of greater than 90, 91, 92, 93, 94, or 95 degrees (when tested as further described in the examples). In some embodiments, the hydrophobic material of the block copolymer can be characterized by the static contact angle with water of a homopolymer of the monomer or oligomer starting material utilized in the preparation of the block copolymer. For example, a homopolymer of octadecyl acrylate is reported in the literature as having a contact angle with water of greater than 100 degrees. The hydrophobic material may be described as an olefin polymer or copolymer. In some embodiments, the olefin polymer may be described as a polyolefin. However, the molecular weight is typically substantially lower than film grade polyolefin thermoplastic materials. Alternatively, the hydrophobic material of the block copolymer additive may be characterized as an alkyl or alkenyl group.

The block copolymer typically has the structure:

A[LB]$_n$ wherein A is a polyalkylene oxide block, B is independently a hydrophobic block, L is a covalent bond or a divalent (e.g. organic) linking group, and n is at least 1.

In some embodiments, n is 1, and the block copolymer can be characterized as having a linear diblock (A-B) structure. In other embodiments, n is 2 and the block copolymer can be characterized as a linear triblock (B-A-B) structure wherein B are hydrocarbon (e.g. C16-C70) end blocks and A is the polyalkylene oxide midblock. In other embodiments, n is greater than 2 such as at least 3, 4, 5, or 6. When n is greater than 2, there can be a distribution including diblock structures, triblock structures, and structures wherein n is at least 3. When there is a distribution of structures, n may be expressed as an average value. For example, n may be 2.5, meaning n is 3 or more (e.g. for at least 50% of the structures) and 2 or less (e.g. for at least 50% of the structures) such than n averages 2.5. Without intending to be bound by theory, it is surmised that block copolymer additives having more than one (e.g. two) hydrophobic blocks can anchor the additive within a thermoplastic polymer matrix better than a single block.

The polyalkylene oxide block typically comprises polyethylene oxide (PEG), polypropylene oxide (PPG), or a combination thereof. In some embodiments, the block copolymer comprises both polyethylene oxide and polypropylene oxide. In some embodiments, the number of polymerized (e.g. repeat) units of polyethylene oxide is typically greater than the number of polymerized (e.g. repeat) units of polypropylene oxide. In other embodiments, the number of polymerized (e.g. repeat) units of polyethylene oxide is less than the number of polymerized (e.g. repeat) units of polypropylene oxide.

The block copolymer additive is typically prepared by reaction of a polyalkylene oxide having one or more terminal first functional groups that react (e.g. covalently bond) with a second functional group of a hydrophobic monomer or oligomer. In some embodiments, the block copolymer additive is prepared by reaction of a hydrophobic monomer or oligomer comprising an ethylenically unsaturated (e.g. (meth)acrylate) group and a polyalkylene oxide having a functional group or groups that react with the ethylenically unsaturated (e.g. (meth)acrylate) group.

In some embodiments, the functional group or groups of the polyalkylene oxide are amine groups. Various polyalkylene oxide monoamines and diamines are commercially available from various suppliers including Huntsman and Aldrich.

In some embodiments, the polyalkylene oxide block (i.e. PEG, PPG, or combination thereof) has a number average molecular weight (Mn) of at least 200, 150, 250, 300, 350, 400, 450, 500, 550, 600, 650, 700, 750, 800, 850, 900, 950, or 1000 g/mole. In some embodiments, the polyalkylene oxide block (i.e. PEG, PPG, or combination thereof) has a number average (Mn) molecular weight of at least 250, 300, 350, 400, 450, 500, 550, 600, 650, 700, 750, 800, 850, 900, 950, or 1000 g/mole. In some favored embodiments, the polyalkylene oxide block (i.e. PEG, PPG, or combination thereof) has a molecular weight of at least 1250, 1500, 1750, or 2000 g/mole. The polyalkylene oxide block (i.e. PEG, PPG, or combination thereof) typically has a molecular weight of no greater than 20,000 or 15,000 or 10,000 g/mole. In some favored embodiments, the polyalkylene oxide block (i.e. PEG, PPG, or combination thereof) has a molecular weight no greater than 9000, 8500, 8000, 7500, 7000, 6500, 6000, 5500, 5000, 4500, 4000, 3500, 3000, or 2500 g/mole. Throughout the present patent application, molecular weight refers to number average molecular weight unless specified otherwise. Without intending to be bound by theory, it is surmised that high molecular weight polyalkylene oxide blocks together with the anchoring affect of the hydrophobic block(s) is amenable to providing a (e.g. microstructured) surface with durable hydrophilic properties.

In some embodiments, a combination of polyalkylene oxide blocks can be used, each having different polyalkylene oxides (e.g. PEG and PPG) or different concentrations of polyalkylene oxides. In some embodiments, the block copolymer additive may comprise a combination of polyalkylene oxide blocks having different molecular weights. In such embodiments, the average molecular weight of the polyalkylene oxide blocks (i.e. having different molecular weights) typically falls within the molecular weight ranges just described.

Various (e.g. free-radically polymerizable) ethylenically unsaturated reagents or in other words starting materials comprising an alkyl or alkenyl group can be used in the preparation of the block copolymer additive. In some embodiments, the alkyl or alkenyl group comprises greater than 4 contiguous carbon atoms. Without intending to be bound by theory, it is surmised that longer hydrophobic blocks can anchor the additive within the thermoplastic polymer matrix. The carbon atoms of the (meth)acrylate group are not included in the number of contiguous carbon atoms. In some embodiments, the alkyl or alkenyl group comprises at least 5, 6, 7, 8, 9, 10, 11, 12, 13, 14, 15, 16, 17, or 18 contiguous carbon atoms. The alkyl group may be linear or branched. The alkyl or alkenyl group typically comprises no greater than 70, 65, 60, 55, or 50 (e.g. contiguous) carbon atoms. In some embodiments, the alkyl group has no greater than 45, 40, 35, or 30 (e.g. contiguous) carbon atoms. Representative examples of ethylenically unsaturated starting materials comprising an alkyl or alkenyl group include octadecyl (meth)acrylate, nonadecyl (meth) acrylate, (meth)eicosanyl acrylate, (meth)behenyl acrylate, and the like. Such starting materials typically have a molecular weight no greater than 1000, 900, 800, 700, 600, or 500 g/mole. The alkyl or alkenyl group typically has a molecular weight of at least 200, 225, or about 250 g/mole. One representative monomer, octadecyl acrylate is depicted as follows:

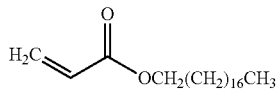

As illustrated with octadecyl acrylate, the hydrophobic block (e.g. alkyl group) is a terminal block or group. Such hydrophobic block (e.g. alkyl group) is typically linear or branched. In some embodiments, the hydrophobic block (e.g. alkyl group) is linear. Further, the monomer is a monofunctional ethylenically unsaturated monomer, having a single ethylenically unsaturated (e.g. (meth)acrylate) group. The ethylenically unsaturated group $CH_2=CH-$ is typically bonded to the hydrophobic block (e.g. alkyl group) through an ester linking group —(CO)O—. However, other divalent or higher valency organic linking groups may be present instead of an ester linkage, provided that the organic linking group does not detract from the hydrophobic properties of hydrophobic block. In some embodiments, at least 16, 17, or 18 carbon atoms of the alkyl or alkenyl group are typically contiguous. However, the alkyl or alkenyl group may optionally be interrupted with heteroatoms or other substituents that do not detract from the hydrophobic properties of the hydrophobic block. In some embodiments, acrylate is favored over methacrylate.

In some embodiments, a combination of hydrophobic blocks (e.g. alkyl or alkenyl groups) can be used, each having different chain lengths. In such embodiment, the average chain length typically falls within the molecular weight ranges just described. Further, the mixture of hydrophobic blocks (e.g. alkyl or alkenyl groups) have a static contact angle with water of greater than 90, 91, 92, 93, 94, or 95 degrees, as previously described. In other embodiments, at least one of the hydrophobic blocks comprises at least 16, 17, or 18 (e.g. contiguous) carbon atoms.

Ethylenically unsaturated monomers comprising at least 16, 17, or 18 (e.g. contiguous) carbon atoms are typically solid at room temperature and have a relatively low melting point (i.e. 22, 23, 24, or 25° C.). Thus, the hydrophobic block has a sufficient chain length such that it is a solid at room temperature.

In some embodiments, block copolymer additive has a melting temperature (Tm) of at least 20, 25, 30, 35, 40, 45, or 50° C. In some embodiments, the melt point is no greater than 150, 145, 140, 135, 130, 125, 120, 115, 110, 105, 95 or 90° C.

In some embodiments, the block copolymer has a melting temperature no greater than 55° C. The melting temperature can be measured by Differential Scanning Calorimetry (DSC) according to the test method described in the example.

In some embodiments, the block copolymer additive has a glass transition temperature (Tg) ranging from −65° C. to about −50, −45, or −40° C. The Tg can be measured by Differential Scanning Calorimetry (DSC) according to the test method described in the example.

The block copolymer additive has good thermal stability. In some embodiments, the block copolymer additive has a loss of mass of no greater than 10, 9, 8, 7, 6, or 5 wt. % at 172° C. when measured with Thermal Gravimetric Analysis according to the test method described in the examples.

In some embodiments, the weight ratio of polyalkylene oxide (PEG, PPG, or a combination thereof) moieties to hydrophobic (e.g. alkyl) moieties ranges from 25:1 to 2:1. Thus, the block copolymer additive typically has more polyalkylene oxide (PEG, PPG, or a combination thereof) by weight as compared to the amount by weight of hydrophobic block. In some embodiments, the weight ratio of polyalkylene oxide (PEG, PPG, or a combination thereof) moieties to hydrophobic (e.g. alkyl) moieties is no greater than 20:1, 15:1, or 10:1. In some embodiments, the weight ratio of polyalkylene oxide (PEG, PPG, or a combination thereof) moieties to hydrophobic (e.g. alkyl) moieties is no greater than 9:1, 8:1, 7:1, 6:1, 5:1, or 4:1.

In some embodiments, the molecular weight of the block copolymer additive is approximately equal to the sum of the molecular weight of the functional polyalkylene oxide, as described above, and the molecular weight of the hydrophobic block(s) (e.g. alkyl or alkeny groups). The linking group may be a covalent bond or a heteratom-containing linking group. Each linking group typically increases the molecular weight of the block copolymer by no greater than about 150, 125, 100, or 75 g/mole.

One representative block copolymer additive is as follows:

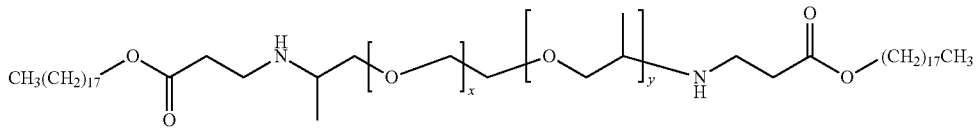

The block copolymer additive is blended with a thermoplastic polymer, as previously described, using conventional melt processes and apparatuses to form a blend. Particularly suitable thermoplastic polymers include linear or branched polyolefins. Exemplary polyolefins include, but are not limited to, polyethylene, polypropylene, poly-α-olefins, and copolymers thereof, including low density polyethylene (LDPE), high density polyethylene (HDPE), linear low density polyethylene (LLDPE), ultra-high density polyethylene (UHDPE), and polyethylene-polypropylene copolymers, as well as polyolefin copolymers having non-olefin content (that is, content derived from monomers that are not olefins). Polyolefin polymers can further comprise small concentrations (e.g. 1-5 wt. %) of polymerized units of non-olefin monomers including (meth)acrylic acid, as known in the art. Other olefin copolymers can comprise higher amounts of comonomers. In some embodiments, the olefin polymer may comprise at least 10, 15, 20, or 25 wt. % of (e.g. vinyl acetate) comonomer. The amount of (e.g. vinyl acetate) comonomer is typically no greater than about 40 or 35 wt. %. Such thermoplastic polymers are typically characterized as non-ionic. Useful polymers and blends further include recycled blends of commingled thermoplastic waste streams, and blends of recycled polymers with virgin polymers.

In some embodiments, the thermoplastic (e.g. polyolefin) polymer has a melt flow index of less than 40, 35, 30, 25, or 20 g/10 min at 190° C. (2.16 kg ASTM D 1238) or in other words "film grade" or "injection molding grade" thermoplastic polymers. In some embodiments, the thermoplastic (e.g. polyolefin) polymer has an elongation at break of at least 250, 350, or 450% ranging up to 550, 650, or 750%. In some embodiments, the thermoplastic (e.g. polyolefin) polymer has an ultimate tensile strength of at least 5, 6, 7, or 8 MPa ranging up to 9 or 10 MPa. In some embodiments, the thermoplastic (e.g. polyolefin) polymer has an ultimate tensile strength of at least 10, 15 or 20 MPa ranging up to 30 or 35 MPa. The tensile and elongation properties can be measured according to ASTM D882. In some embodiments, the thermoplastic (e.g. polyolefin) polymer has an ultimate tensile strength of at least 5, 6, 7, or 8 MPa ranging up to 9 or 10 MPa. In some embodiments, the thermoplastic (e.g. polyolefin) polymer has a flexural modulus of at least 0.1, 0.2, or 0.3 GPa ranging up to 0.4 or 0.5 GPa.

In some embodiments, the block copolymer additive is blended with the thermoplastic polymer in an amount of about 0.1 wt. % to 30 wt. % based on the total weight of the (e.g. microstructures) film layer or composition. In some embodiments, the amount of block copolymer additive is at least 0.1, 0.2, 0.3, 0.4, 0.5, 0.6, 0.7, 0.8, 0.9, or 1 wt. % of the (e.g. microstructured) film layer or composition. In some embodiments, the amount of block copolymer additive is at least 2, 3, 4, or 5 wt. % of the (e.g. microstructured) film layer or composition. In some embodiments, the amount of block copolymer additive is no greater than 29, 28, 27, 26, 25, 24, 23, 22, 21, 20, 15, 14, 13, 12, 11, or 10 wt. % of the composition. Although concentrations greater than 5, 6, 7, 8, 9, or 10 wt. % can be preferred when the molecular weight of the polyalkylene oxide (e.g. PEG) block is about 2000 g/mole, in the case of a 10,000 molecular weight polyalkylene oxide (e.g. PEG) block, the preferred concentration may be about 2-5 wt. %.

The amount of polyalkylene (PEG, PPG, or a combination thereof) blocks in the composition, (e.g. microstructured) film, or (e.g. microstructured) layer comprises no greater than 30, 25, 20, or 15 wt. % of poly(alkylene oxide) (PEG, PPG, or a combination thereof) moieties based on the total amount of thermoplastic polymer and block copolymer additive.

The polyalkylene (PEG, PPG, or a combination thereof) blocks may be uniformly dispersed throughout the composition or (e.g. microstructured) film surface layer or the polyalkylene (PEG, PPG, or a combination thereof) blocks may migrate to the surface. In the latter case, a greater concentration of polyalkylene (PEG, PPG, or a combination thereof) blocks is present at the (e.g. microstructured) film surface layer than underlying layers.

In other embodiments, the block copolymer additive is compounded as a masterbatch composition having a higher concentration of block copolymer additive. For example, the masterbatch composition may comprise up to 35, 40, 45, or 50 wt. % of the block copolymer additive described herein.

The masterbatch may be processed into a form that is easily storable or shippable, such as pellets, flakes, granules, and the like. In another embodiment, a masterbatch may be formed by solution coating pellets, flakes, or granules of a thermoplastic with a solution of the block copolymer additive described herein and drying the solvent. The masterbatch is later blended with a thermoplastic polymer to form a composition or microstructured layer having a lower amount of block copolymer additive as described above.

The composition typically comprises 50 to 99.9 wt. % of thermoplastic (e.g. polyolefin) polymer based on the total weight of the thermoplastic polymer and block copolymer additive (i.e. excluding other optional additives). In some embodiments, the (e.g. microstructured) film or (e.g. microstructured) layer comprises at least 70, 71, 72, 73, 74, 75, 76, 77, 78, 79, 80, 81, 82, 83, 84, or 85 wt. % thermoplastic polymer, based on the total weight of the thermoplastic polymer and block copolymer additive.

In some embodiments, the composition optionally further includes one or more additives. For example, in embodiments, the additives include one or more UV stabilizers, thermal stabilizers, fillers, colorants, UV or fluorescent dyes, antimicrobial compositions, crosslinkers, solvents, plasticizers, mixtures of two or more thereof, and the like. The one or more additives typically can be present in the composition in amounts ranging from about 0.01 wt. % to 10 wt. % based on the total composition and may depend on the type of additive and the final properties of the blend desired. In some embodiments, the amount of additives is no greater than 9, 8, 7, 6, 5, 4, 3, 2, or 1 wt. % of the composition.

Various equipment may be used for melt blending of the thermoplastic polymer with the block copolymer additive alone or in combination with other optional additives. Suitable equipment includes kneaders and extruders. Extruders include single screw and twin-screw extruders. Temperature profiles employed to form the blends are selected based on the type of thermoplastic resin employed to form the blends and often according to the supplier's guidelines for melt processing. In some embodiments, it is desirable to employ a twin-screw extruder to form a masterbatch, or a (e.g. microstructured) film layer, wherein an intensive mixing screw design is employed. Such screw designs lead, in embodiments, to optimal mixing of the block copolymer additive with the thermoplastic in the extruder barrel. The selected block copolymer additive is added as-is or in masterbatch form to the thermoplastic resin, optionally in addition to one or more additives, to form a blend. The block copolymer additive can be added as a (e.g. molten) liquid or a solid to the thermoplastic resin to form a microstructured layer or a masterbatch. Liquid delivery is accomplished by pre-heating the block copolymer additive, for example via a heated delivery means such as a heated gear pump and transfer line leading to the apparatus, where the molten thermoplastic resin is contacted with the liquid block copolymer additive and the components are blended to form the blend or the masterbatch.

In some embodiments, solid delivery to form a (e.g. microstructured) film or layer or a masterbatch is accomplished by feeding the thermoplastic resin and the block copolymer additive separately into the melt blending apparatus, wherein the block copolymer additive is in a flake, pellet, chip, granule, or powder form. In other embodiments, the block copolymer additive is admixed with pellets of the thermoplastic resin and the admixture is fed into the melt blending apparatus.

The composition described herein can be used to make films. The film may further comprise a (e.g. pressure sensitive) adhesive layer disposed on a major surface. The pressure sensitive adhesive layer may optionally further comprise a release layer. In some embodiments, the adhesive coated film may be characterized as a tape. In some favored embodiments, the film or tape comprises a microstructured surface, as previously described. In other embodiments, the film may be unstructured.

In some embodiments, a (e.g. microstructured) film is formed as a single layer. In some embodiments, thermoplastic compositions are coextruded with one or more additional layers to form a multilayer construction. The one or more additional layers beneath the (e.g. microstructured) surface layer are substantially free of the block copolymer additive.

The thickness of the microstructured surface layer or film is typically at least 10, 15, 20, 25, 30, 35, 40, 45, or 50 microns (2 mils) ranging up to 1 cm thick as extruded. In some embodiments, the thickness of the (e.g. microstructured) surface layer or film is no greater than 1000, 750, 500, or 250 microns.

The compositions and (e.g. microstructured) films described herein have hydrophilic properties. In some embodiments, the composition or film has an initial static contact angle with water of less than 90, 85, 80, 75, 70, 65, 60, 55, 50 or 45 degrees. The composition or film typically has an initial static contact angle of at least 35, 36, 37, 38, or 39 degrees (e.g. greater than polyethylene oxide homopolymer). In some embodiments, the composition or film has a static contact angle with water after 14, 30, or 50 days of less than 90, 85, 80, 75, 70, 65, 60, 55, or 40 degrees. In some embodiments, the hydrophilic properties of the composition or film are durable. In one embodiment, the static contact angle with water after being immersed and agitated in deionized water for 10 seconds and dried of the composition or film is less than 90, 85, 80, 75, 70, 65, 60, 55, or 40 degrees. In some embodiments, the composition or film exhibits a decrease (as compared to before being immersed in water) in static contact angle with water after being immersed and agitated in deionized water for 10 seconds and dried of no greater than 40, 30, 20 or 10 degrees. In some embodiments, the hydrophilic properties of the microstructured surface can be determined by measuring the vertical wicking height. As the contact angle with water decreases, the vertical wicking height increases. Thus, the microstructured surface or article exhibits greater vertical wicking than the same microstructured surface or article without the block copolymer additive. In some embodiments, the vertical wicking height after 2 minutes is at least 0.5, 1, 2, 2.5, 3, 3.5, 4, 4.5, or 5 cm. In other embodiments, the vertical wicking height after 2 minutes is at least 10 or 15 cm. These properties can be determined according to the test methods described in the examples.

In some embodiments, the microstructured film and tape articles further comprise a substrate (e.g. tape backings) In some embodiments, the substrate is an organic polymeric film, metal coated film, metallic foil, paper, foam, or (e.g. woven or non-woven) fibrous web. In some embodiments, the substrate is a woven (including knitted) or (e.g. spunbond or melt blown) nonwoven fibrous web. For example, the thermoplastic composition comprising the block copolymer additive described herein can be extruded or otherwise coated onto a substrate with the opposing surface of the composition contacting the tool surface. In this embodiment, the (e.g. microstructured) surface layer may be only slightly thicker than the height of the microstructures.

The thickness of the substrate can be in the same range as the microstructured surface layer described above. In some embodiments, the thickness of the substrate is at least 0.5 or 1 mm and no greater than 3 or 2 mm.

The invention is further illustrated by the following examples which are not intended to be limiting in scope. Unless indicated otherwise, the molecular weights refer to number average molecular weights. All parts, percentages and ratios are by weight unless otherwise specified.

| Material | Abbreviation | Description |
|---|---|---|
| Amine-terminated polyether 2000 g/mol | PEG 1 | "Jeffamine ED- 2003" obtained from Huntsman Corporation (Woodlands, TX) |
| Amine-terminated polyether 6000 g/mol | PEG 2 | "14504" obtained from Sigma Aldrich (St. Louis, MO) |
| Amine-terminated polyether 600 g/mol | PEG 3 | "Jeffamine ED- 600" obtained from Huntsman Corporation (Woodlands, TX) |
| Trifunctional amine-terminated polyether 5000 g/mol | PPG 1 | "Baxxodur EC11" obtained from BASF (Florham Park, NJ) |
| Trifunctional amine-terminated polyether 400 g/mol | PPG 2 | "Baxxodur EC310" obtained from BASF (Florham Park, NJ) |
| Octadecyl acrylate | ODA | Obtained from Sigma Aldrich (St. Louis, MO) |
| Polyethylene-block-poly(ethylene glycol) | Additive 6 | "525901" obtained from Sigma Aldrich (St. Louis, MO), Mn = 2,250 g/mole, ethylene content 80 wt. %, mp = 90° C. |
| Polyethylene-block-poly(ethylene glycol) | Additive 7 | "458961" obtained from Sigma Aldrich (St. Louis, MO), Mn = 1,400 g/mole, ethylene content 50 wt. %, mp = 115° C. |
| Polyethylene-block-poly(ethylene glycol) | Additive 8 | "459003" obtained from Sigma Aldrich (St. Louis, MO) Mn = 575 g/mole, ethylene content 20 wt. %, mp = 101° C. |
| Polyethylene | M1 | "955i" obtained from Dow (Midland, MI) |
| Ethylene-vinyl acetate copolymer (28 wt. % VA) | M2 | "Elvax 3180" obtained from Dupont (Wilmington, DE) |

Synthesis of Polyethylene-Polyether Block Copolymer (Additive 1)

A solution of amine-terminated polyether (Jeffamine ED-2003, 0.019 mol amine, 19.9 g) and octadecyl acrylate (0.019 mol, 6.3 g) was prepared in 10 mL toluene-isopropyl alcohol (4/1 v/v). The reaction mixture was stirred at 50° C. for 24 hrs, and solvents were removed in vacuo to give the product as a white waxy solid in quantitative yield. The product was characterized by NMR. Additives 2-5 were synthesized using the method described for Additive 1 above. Difunctional amines PEG 2 and PEG 3 were reacted with ODA to give Additives 2 and 3 respectively. Trifunctional amines PPG 1 and PPG 2 were reacted with ODA to give Additives 4 and 5 respectively.

Nuclear Magnetic Resonance (NMR)—NMR samples were analyzed as solutions in deuterated tetrahydrofuran (THF). One dimensional (1D) proton data were collected using a Bruker Avance 600 MHz NMR spectrometer equipped with a cryogenically cooled probe head. Homo- and hetero-nuclear, two-dimensional (2D) NMR data were also collected to confirm the spectral assignments. One of the residual proto-solvent resonances was used as a secondary chemical shift reference in the proton dimension ($\delta$=1.73). All the NMR data were collected with the sample held at 25° C.

The polyethylene-polyether block copolymer (additive 1) had the following structure according to the NMR analysis, wherein x is 65 and y is 0.

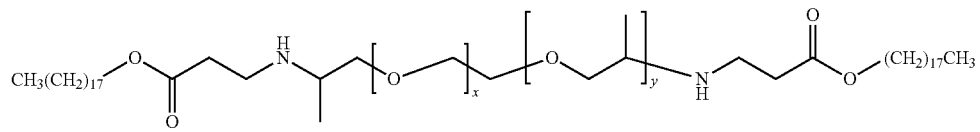

Thermal Gravimetric Analysis (TGA)—Additive 1 was analyzed using a TA Instruments Discovery Thermogravimetric Analyzer (TGA). The sample was subjected to a heating profile ranging from room temperature (~25° C.) to 700° C. in a nitrogen atmosphere, with a linear heating rate of 20.0° C./min and a Hi-Res resolution setting of 4.0.

The loss of mass of Additive 1 was 5% at 172° C.

Dynamic Scanning Calorimetry (DSC)—DSC samples were prepared for thermal analysis by weighing and loading the material into TA Instruments aluminum DSC sample pans. The specimens were analyzed using the TA Instruments Discovery Differential Scanning Calorimeter (DSC-SN DSC1-0091) utilizing a heat-cool-heat method in standard mode (−155 to ~50° C. at 10° C./min.). After data collection, the thermal transitions were analyzed using the TA Universal Analysis program. Glass transition temperatures were evaluated using the step change in the standard heat flow (HF) curves, and melting points using the endotherms in the standard heat flow (HF) curves. The midpoint (half height) temperature of the second heat transition is quoted.

The polyethylene-polyether block copolymer (Additive 1) had a glass transition temperature (Tg) of −50° C. (10° C. min$^{-1}$, N$_2$) and a melt temperature (Tm) of 36° C.

Fabrication of parts—Micro-extruded parts were fabricated using a DSM Research Micro 15 twin screw micro compounder (150 rpm). Temperature settings for M1 formulations: upper region 175° C., middle region 180° C., lower/die region 185° C. Temperature settings for M2 formulations: upper region 190° C., middle region 195° C., lower/die region 200° C. Mixtures of M1 or M2 and copolymer additive 1 at the appropriate mass ratios were fed into the hopper (total mass 15 g), allowed to circulate for 1 min, extruded, and collected on a flat aluminum surface, resulting in discs (1-2 inch diameter).

TABLE 2

Formulations

| Example | Component 1 - C1 | Parts C1 | Component 2 - C2 | Parts C2 |
|---|---|---|---|---|
| CE1 | M1 - PE | 100 | Additive 1 | 0 |
| CE2 | M2 - EVA | 100 | Additive 1 | 0 |
| E1 | M1 | 99 | Additive 1 | 1 |
| E2 | M1 | 98 | Additive 1 | 2 |
| E3 | M1 | 95 | Additive 1 | 5 |
| E4 | M1 | 90 | Additive 1 | 10 |
| E5 | M1 | 85 | Additive 1 | 15 |
| E6 | M1 | 75 | Additive 1 | 25 |
| E7 | M2 | 99 | Additive 1 | 1 |
| E8 | M2 | 98 | Additive 1 | 2 |
| E9 | M2 | 95 | Additive 1 | 5 |
| E10 | M2 | 90 | Additive 1 | 10 |
| E11 | M2 | 85 | Additive 1 | 15 |
| E12 | M2 | 75 | Additive 1 | 25 |
| E13 | M1 | 99 | Additive 6 | 1 |
| E14 | M1 | 98 | Additive 6 | 2 |
| E15 | M1 | 95 | Additive 6 | 5 |
| E16 | M1 | 90 | Additive 6 | 10 |
| E17 | M1 | 85 | Additive 6 | 15 |

TABLE 2-continued

Formulations

| Example | Component 1 - C1 | Parts C1 | Component 2 - C2 | Parts C2 |
|---|---|---|---|---|
| E18 | M1 | 99 | Additive 7 | 1 |
| E19 | M1 | 98 | Additive 7 | 2 |
| E20 | M1 | 95 | Additive 7 | 5 |
| E21 | M1 | 90 | Additive 7 | 10 |
| E22 | M1 | 85 | Additive 7 | 15 |
| E23 | M1 | 99 | Additive 8 | 1 |
| E24 | M1 | 98 | Additive 8 | 2 |
| E25 | M1 | 95 | Additive 8 | 5 |
| E26 | M1 | 90 | Additive 8 | 10 |
| E27 | M1 | 85 | Additive 8 | 15 |
| E28 | M2 | 99 | Additive 6 | 1 |
| E29 | M2 | 98 | Additive 6 | 2 |
| E30 | M2 | 95 | Additive 6 | 5 |
| E31 | M2 | 90 | Additive 6 | 10 |
| E32 | M2 | 85 | Additive 6 | 15 |
| E33 | M2 | 75 | Additive 6 | 25 |
| E34 | M2 | 99 | Additive 7 | 1 |
| E35 | M2 | 98 | Additive 7 | 2 |
| E36 | M2 | 95 | Additive 7 | 5 |
| E37 | M2 | 90 | Additive 7 | 10 |
| E38 | M2 | 85 | Additive 7 | 15 |
| E39 | M2 | 75 | Additive 7 | 25 |
| E40 | M2 | 99 | Additive 8 | 1 |
| E41 | M2 | 98 | Additive 8 | 2 |
| E42 | M2 | 95 | Additive 8 | 5 |
| E43 | M2 | 90 | Additive 8 | 10 |
| E44 | M2 | 85 | Additive 8 | 15 |
| E45 | M2 | 75 | Additive 8 | 25 |

Contact angle measurements—Surfaces for contact angle experiments were created by heating a micro-extruded disc on a glass slide at 120° C. for 2 hrs. Static (deionized) water contact angles were measured at room temperature using a Kruss (Hamburg, Germany) DSA100 contact angle instrument (5 microliter drop delivered at 195 microliters per minute) on the surfaces of the discs. Mean values of five replicates are given (standard deviations in the range 0.5 to 5 degrees). In between measurements, samples were left to stand in ambient laboratory conditions.

In experiments to determine contact angle before and after water washing, the sample was immersed and agitated in deionized water for 10 seconds, removed, excess water was shaken then wiped off, and the sample was left to dry for 3 hrs in ambient laboratory conditions.

TABLE 3

Contact Angles

| Formulation | Preparation method | Contact Angle (° Water) Days | | | | | |
|---|---|---|---|---|---|---|---|
| | | 0 | 7 | 14 | 30 | 50 | 600 |
| CE1 | Micro-extrusion | 93 | 94 | 95 | — | — | 98 |
| CE1 | Melt extrusion | 96 | — | — | — | 96 | — |
| E1 | Micro-extrusion | 54 | 74 | 73 | — | — | 98 |
| E2 | Micro-extrusion | 53 | 70 | 66 | — | — | 78 |
| E2 | Melt extrusion | — | — | — | — | 88 | — |
| E3 | Micro-extrusion | 51 | 63 | 47 | — | — | 68 |
| E4 | Micro-extrusion | 40 | 47 | 50 | — | — | 67 |
| E5 | Micro-extrusion | 45 | 45 | 51 | — | — | 66 |
| E6 | Micro-extrusion | 46 | 52 | 61 | — | — | 40 |
| CE2 | Micro-extrusion | 76 | — | 71 | 76 | 71 | — |
| E7 | Micro-extrusion | 51 | — | — | — | 79 | — |
| E8 | Micro-extrusion | 42 | — | 49 | 52 | 81 | — |
| E9 | Micro-extrusion | 40 | — | 47 | 52 | 86 | — |
| E10 | Micro-extrusion | 41 | — | 51 | 52 | 51 | — |
| E11 | Micro-extrusion | 42 | — | 47 | 52 | 44 | — |
| E12 | Micro-extrusion | 41 | — | 48 | 51 | 45 | — |
| E13 | Micro-extrusion | 93 | — | — | 94 | — | — |
| E14 | Micro-extrusion | 93 | — | — | 94 | — | — |
| E15 | Micro-extrusion | 89 | — | — | 86 | — | — |
| E16 | Micro-extrusion | 85 | — | — | 77 | — | — |
| E17 | Micro-extrusion | 44 | — | — | 47 | — | — |
| E18 | Micro-extrusion | 84 | — | — | 77 | — | — |
| E19 | Micro-extrusion | 86 | — | — | 84 | — | — |
| E20 | Micro-extrusion | 46 | — | — | 51 | — | — |
| E21 | Micro-extrusion | 36 | — | — | 42 | — | — |
| E22 | Micro-extrusion | 28 | — | — | 47 | — | — |
| E23 | Micro-extrusion | 91 | — | — | 82 | — | — |
| E24 | Micro-extrusion | 93 | — | — | 82 | — | — |
| E25 | Micro-extrusion | 51 | — | — | 48 | — | — |
| E26 | Micro-extrusion | 22 | — | — | 26 | — | — |
| E27 | Micro-extrusion | 28 | — | — | 18 | — | — |
| E28 | Micro-extrusion | 77 | — | — | 45 | — | — |
| E29 | Micro-extrusion | 76 | — | — | 30 | — | — |
| E30 | Micro-extrusion | 68 | — | — | 29 | — | — |
| E31 | Micro-extrusion | 75 | — | — | 29 | — | — |
| E32 | Micro-extrusion | 46 | — | — | 24 | — | — |
| E33 | Micro-extrusion | 42 | — | — | 29 | — | — |
| E34 | Micro-extrusion | 71 | — | — | 36 | — | — |
| E35 | Micro-extrusion | 70 | — | — | 33 | — | — |
| E36 | Micro-extrusion | 72 | — | — | 34 | — | — |
| E37 | Micro-extrusion | 57 | — | — | 33 | — | — |
| E38 | Micro-extrusion | 32 | — | — | 26 | — | — |
| E39 | Micro-extrusion | 32 | — | — | 24 | — | — |
| E40 | Micro-extrusion | 78 | — | — | 54 | — | — |
| E41 | Micro-extrusion | 77 | — | — | 46 | — | — |
| E42 | Micro-extrusion | 78 | — | — | 32 | — | — |
| E43 | Micro-extrusion | 73 | — | — | 28 | — | — |
| E44 | Micro-extrusion | 64 | — | — | 23 | — | — |
| E45 | Micro-extrusion | 51 | — | — | 22 | — | — |

TABLE 4

Change in contact angle after washing

| Formulation | Preparation method | Contact Angle (° Water) | |
|---|---|---|---|
| | | Before wash | After wash |
| E6 | Micro-extrusion | 61 | 66 |

Preparation of Microchannel Fluid Control Film:

Microchannel fluid control films were prepared by heating extruded discs CE2, E7E8 and E12 prepared as described above on a flat nickel tool comprising parallel V-shaped grooves as depicted in FIG. 3. The grooves had a height of 0.030 inches, a pitch of 0.035 inches and a sidewall angle of 40 degrees. The tool was placed on a plate heated to 130° C. The polymer discs were then placed on the heated tool for approximately 5 minutes to melt the polymer. A section of polyester film (Melinex 454, Tecra Inc) was placed on the melted disc. Pressure was applied to the polyester film using a rubber roller to fill the grooves with polymer. The tool was then removed from the heated plate and allowed to cool to room temperature. After cooling the patterned films were removed from the tool.

Vertical Wicking:

Vertical wicking of water in the microchannel fluid control films was determined by first cutting the embossed film into 1 cm strips in line with the channel direction. The strips were then placed in a V-bottomed trough containing a deionized water solution containing hydroxypyrenetrisulfonic acid trisodium salt (Aldrich Chemical Company, H1529, 70 mg/500 ml) with the bottom edge of the strips immersed in the liquid. The height of the liquid pulled into the channels by capillary action was determined after 2 minutes using a hand-held UV light (365 nm) to visualize the fluorescent dye in the solution. No wicking was observed in the control sample CE2 containing no additive. Approximately 2 cm of vertical wicking was observed for Samples E7 (1%), E8 (2%) and E12 (25%).

What is claimed is:

1. An article comprising a microstructured surface, wherein the microstructured surface comprises
   a thermoplastic polymer; and
   a block copolymer additive comprising a poly(alkylene) oxide block having a number average molecular weight greater than 250 g/mole and a least one hydrophobic block;
wherein the microstructured surface comprises a plurality of channels having channel longitudinal axes that form an angle between 0 to 90 degrees with respect to the longitudinal axis of the outer surface.

2. The article of claim 1 wherein the block copolymer additive has the general structure:

wherein
   A comprises poly(alkylene oxide),
   L is a covalent bond or a divalent linking group,
   B independently comprises a hydrophobic block;
   n is at least 1.

3. The article of claim 1 wherein the poly(alkylene oxide) is polyethylene oxide, polypropylene oxide, or a combination thereof.

4. The article of claim 1 wherein the microstructured article comprises no greater than 30, 25, 20, or 15 wt. % of poly(alkylene oxide) moieties based on the total amount of thermoplastic polymer and block copolymer additive.

5. The article of claim 1 wherein the block copolymer additive has a number average molecular weight of at least 500, 1000, 1500 or 2000 g/mole.

6. The article of claim 2 wherein the A block has a number average molecular weight of at least 1000, 1500, or 2000 g/mole.

7. The article of claim 2 wherein the B block is a hydrocarbon group comprising 8-70 carbon atoms.

8. The article of claim 2 wherein the B block independently has a number average molecular weight of at least 200, 225, 250, or 275 g/mole.

9. The article of claim 1 wherein the thermoplastic polymer is an olefin polymer.

10. The article of claim 1 wherein the thermoplastic polymer is polyethylene, polypropylene, or ethylene vinyl acetate.

11. The article of claim 1 wherein the thermoplastic polymer has a melt flow index of less than 40, 35, 30, 25, 20 g/10 min at 190° C. at a load of 2.16 kg.

12. The article of claim 1 wherein the article has greater vertical wicking than the same article without the block copolymer additive.

13. The article of claim 1 wherein the article has a vertical wicking of at least 0.5 cm.

14. The article of claim 1 wherein the microstructured surface comprises a plurality of channels configured to produce capillary force on a liquid in the channels that is greater than the gravitational force of the liquid.

15. The article of claim 1 wherein the article is a film, tape, or a pipe.

16. An article comprising a microstructured surface, wherein the microstructured surface comprises
  a thermoplastic polymer; and
  a block copolymer additive comprising a poly(alkylene) oxide block having a number average molecular weight greater than 250 or 500 g/mole and a least one hydrophobic block; and wherein the microstructured surface comprises a plurality of channels configured to produce capillary force on a liquid in the channels that is greater than the gravitational force of the liquid.

17. The article of claim 16 wherein the block copolymer additive has the general structure:

A[LB]n wherein

A comprises poly(alkylene oxide),

L is a covalent bond or a divalent linking group,

B independently comprises a hydrophobic block;

n is at least 1.

18. The article of claim 16 wherein the poly(alkylene oxide) is polyethylene oxide, polypropylene oxide, or a combination thereof.

19. The article of claim 16 wherein the thermoplastic polymer is an olefin polymer.

20. The article of claim 16 wherein the article is a film, tape, or a pipe.

* * * * *